(12) United States Patent
Winter et al.

(10) Patent No.: US 9,767,716 B2
(45) Date of Patent: Sep. 19, 2017

(54) COLOR FAN DECK WITH REMOVABLE BLADES

(71) Applicant: Color Communications, Inc., Chicago, IL (US)

(72) Inventors: Steven B. Winter, Highland Park, IL (US); Stanley I. Lerner, Glencoe, IL (US)

(73) Assignee: Color Communications, Inc., Chicago, IL (US)

(*) Notice: Subject to any disclaimer, the term of this patent is extended or adjusted under 35 U.S.C. 154(b) by 203 days.

(21) Appl. No.: 14/669,461

(22) Filed: Mar. 26, 2015

(65) Prior Publication Data

US 2015/0279249 A1 Oct. 1, 2015

Related U.S. Application Data

(60) Provisional application No. 61/972,192, filed on Mar. 28, 2014.

(51) Int. Cl.
*G09B 19/00* (2006.01)
*G09F 5/04* (2006.01)

(52) U.S. Cl.
CPC ............. *G09F 5/042* (2013.01); *G09F 5/04* (2013.01); *G09B 19/0023* (2013.01); *Y10T 29/49947* (2015.01)

(58) Field of Classification Search
CPC ... G09F 7/00; G09F 3/202; G09F 5/04; G09F 11/23; G09F 11/04; A63B 71/0672; B65D 27/00; G06G 1/04

USPC ............. 434/98, 104, 413, 414; 40/492, 495
See application file for complete search history.

(56) References Cited

U.S. PATENT DOCUMENTS

| | | | | |
|---|---|---|---|---|
| 1,142,007 | A | * | 6/1915 | Bauer .................... B42F 17/32 40/376 |
| 1,528,621 | A | * | 3/1925 | Lavers ...................... G01J 3/52 281/15.1 |
| 3,242,959 | A | * | 3/1966 | Glass ................... A45C 11/182 150/147 |
| 4,104,809 | A | * | 8/1978 | Day .......................... G09F 5/04 281/15.1 |
| 4,253,259 | A | * | 3/1981 | Schaffer .................... G09F 5/04 281/15.1 |
| 4,643,452 | A | * | 2/1987 | Chang ................... B42D 15/02 283/62 |
| 5,020,931 | A | * | 6/1991 | Sloot ...................... B42F 21/00 283/36 |
| 5,174,758 | A | * | 12/1992 | Abramson ................ G01J 3/52 434/104 |
| D333,610 | S | * | 3/1993 | Oshry ............................ D6/626 |
| D427,640 | S | * | 7/2000 | Derentz ......................... D20/22 |
| 6,401,372 | B1 | * | 6/2002 | Kovner .................... B42F 5/06 40/404 |

(Continued)

*Primary Examiner* — Kurt Fernstrom
(74) *Attorney, Agent, or Firm* — Fitch, Even, Tabin & Flannery, LLP

(57) ABSTRACT

A fan blade and color display fan deck provide a changeable color display product because the fan deck blades can be added to and removed from the fan deck without opening the fastener to which the fan blades are pivotally attached. Despite being removable from the fan deck, the blades can withstand the normal wear and tear associated with use in a color fan deck such as supporting the weight of the whole fan deck when a user holds an individual fan blade.

21 Claims, 5 Drawing Sheets

(56) References Cited

U.S. PATENT DOCUMENTS

| | | | | |
|---|---|---|---|---|
| D472,268 S | * | 3/2003 | van Dijk | D19/112 |
| D476,694 S | * | 7/2003 | Snow | D20/27 |
| D477,368 S | * | 7/2003 | Massey | D20/27 |
| 6,665,965 B1 | * | 12/2003 | Turchi | G09F 5/04 356/422 |
| 6,830,195 B2 | * | 12/2004 | Morito | G06K 19/07749 235/383 |
| 6,994,553 B2 | * | 2/2006 | DaRif | G09F 5/04 434/98 |
| D540,392 S | * | 4/2007 | Taylor | D20/40 |
| 8,007,621 B2 | * | 8/2011 | Winter | B44D 3/003 156/182 |
| D661,354 S | * | 6/2012 | Karnis | D19/88 |
| D692,954 S | * | 11/2013 | Eisenberg | D20/19 |
| 9,009,999 B2 | * | 4/2015 | Hill | G09F 11/23 40/492 |
| D752,289 S | * | 3/2016 | Tegtmeyer | D28/56 |
| 2015/0253191 A1 | * | 9/2015 | Badri | G01J 3/52 434/98 |

* cited by examiner

Option with Flap

COLOR FAN DECK WITH REMOVABLE BLADES

RELATED APPLICATION(S)

This application claims the benefit of U.S. Provisional application No. 61/972,192 filed Mar. 28, 2014, which is incorporated by reference in its entirety herein.

TECHNICAL FIELD

The present invention relates to color sample display devices in the form of a color fan deck for paint products where paint is illustrated on one or both sides of the fan blades of the fan deck.

BACKGROUND

Paint colors often are displayed on color swatches mounted on a flat planar base, multiple ones of which are joined together to form a deck or a fan deck with fan blades that are pivotally spread or fanned to display color. Each blade in the deck has one or more color swatches or painted areas that display one or more colors. The blades with the paint coated swatches or painted areas on one or both sides of the blades form a fan deck with potentially large numbers of blades and colors. The blades are held at one end of the deck and pivot around a fastener such as a screw or rivet such that the blades can swivel around a longitudinal body of the fastener to display colors to the user. A fan deck is an effective way to display large numbers of colors and color tones.

Advantageously, a fan deck can display many colors with many blades. Users typically will swivel one fan blade out from the fan deck and hold the fan deck by that blade when evaluating a color such as by holding the fan blade up to a wall or other surface to be painted. A problem exists in that the fastener pivotally holding the blades has to be removed, sometimes by destroying the fastener and/or the blades, to free the blades to add new or revised blades with revised colors to the fan deck or to replace blades already in the fan deck. Hours can be spent in unfastening and then refastening the fastener to slip in a new blade or revised blade, and care must be taken to not lose or misarrange fan blades during the time the fastener is not secure. Moreover, the fan blades themselves must have sufficient strength to withstand the rigors of use including supporting the weight of the fan deck during color evaluation by a user.

An object of the fan deck described herein is to provide fan blades for a changeable color fan deck with a plurality of blades that can be changed by adding to the fan blades of the deck or removing fan blades of the deck without removing the fastener holding the individual blades pivotally together.

Other objects will become more apparent with reference to the description set forth below.

SUMMARY

Generally speaking, pursuant to these various embodiments, the fan blade and color display fan deck described herein provide a changeable color display product because the fan deck blades can be added to and removed from the fan deck without opening the fastener to which the fan blades are pivotally attached. Despite being removable from the fan deck, the blades can withstand the normal wear and tear associated with use in a color fan deck such as supporting the weight of the whole fan deck when a user holds an individual fan blade.

In one approach, the blades have openings or holes surrounding the fastener which has a body width. The fastener, for example, may be a post with heads at each end of the posts or a ring. A planar connector of the fan blade defines a channel extending from a first channel end at the opening around which the blade pivots to a second channel end at an edge of the fan blade through which the fastener body moves when adding or removing a fan blade. The channel permits removal and/or addition of the fan blade from/to the fastener to effect a changing of the color display fan deck without the fastener being opened or removed from the color display fan deck. In other words, the channel provides a reusable path for the fastener to slide to and from the opening when adding the blade to and removing the blade from the fan deck. In one aspect, an overlay flap may extend from the connector and fold over at least a portion of the channel without covering the opening in the planar connector around which the blades pivot.

In one aspect, a portion of the channel (such as a shoulder in the channel) has a width less than the width of the body of the fastener to keep the fan blade from sliding off of the fastener and inadvertently separating from the fastener. This portion also has sufficient stiffness to keep the blade from twisting away from the fastener. The planar connector has flexibility and resiliency to flex sufficiently to permit opening the channel to a width larger than the body width of the fastener to allow removal and/or addition of the fan blade from/to the fastener when desired. The planar connector has a deformation strength sufficient to hold the fan deck's weight without deformation to prevent separation of the fan deck from the fastener when the fan deck is held by one blade having the opening and channel. This feature allows the fan deck to be updated with new or different color tones as may be available from a given paint supplier without dismantling the whole fan deck, risking mixing or losing fan blades.

In one example, the planar connector will hold a fan deck when the fan deck has a weight of from about 1.5 to about 30 ounces excluding the weight of the blade by which the fan deck is held. Such strength thereby allows a user to hold a fan blade apart from the other fan blades, for example to evaluate a color, without the fan blade separating from the fan deck. In one aspect, the planar connector may comprise an extension adhered to the planar base of the fan blade.

In a further aspect, a polymeric film may be added to the fan blade, surrounding the opening and/or the channel without covering the opening around which the blade pivots, to provide additional strength to the planar connector to support the fan deck. In another aspect, the film can provide an overlay flap that folds over itself, for example, along a score line, to releasably adhere to, cover, and secure at least a portion of the channel to further prevent inadvertent removal of the fan blade from the fan deck.

Also disclosed herein is a method of revising a color fan deck having a plurality of fan blades as described above without removing the fastener that pivotally holds the fan blades together. The method includes moving the fastener through the channel in the planar connector so that the planar connector surrounds the fastener, where the planar connector has sufficient strength to hold the fan deck's weight without deformation to prevent separation of the fan deck from the fastener when the fan deck is held by one blade having the opening and channel.

A method for making the fan blades is also described herein.

The blades of the fan decks described herein may be any known in the art including a swatch bearing blade including a flat elongated base paper laminated on one or both sides with a paint coated polymeric film as described in U.S. Pat. No. 8,007,621, or the blade may be a paint coated paper blade as described in United States Patent Application Publication No. 2014/0045149 filed Aug. 5, 2013, both of which are incorporated by reference as if fully rewritten herein.

Figure 1:
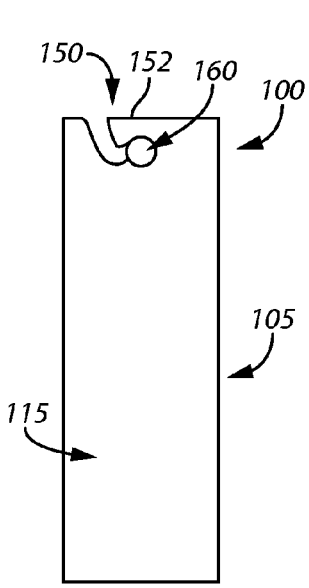
FIG. 1 is a top view of a fan deck with the individual blades precisely aligned on top of each other.
Figure 2:
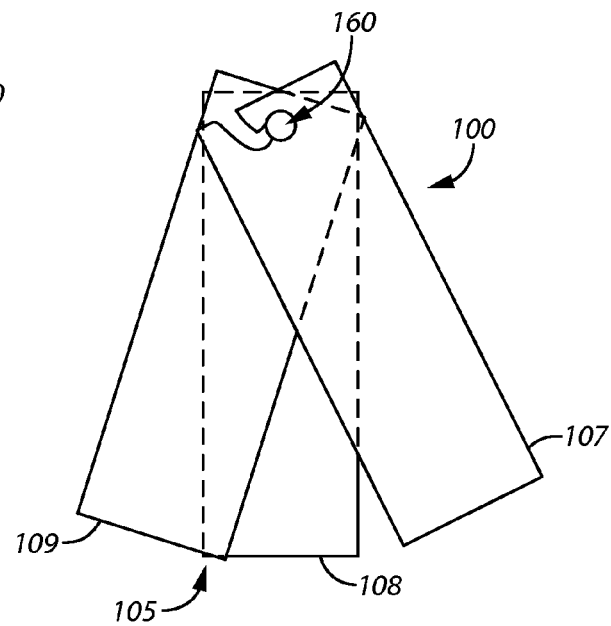
FIG. 2 is a top view of a color fan deck with the blades rotatably or pivotally moved so that the color on each side of the blade can be seen.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Turning now to the drawings and, in particular, FIGS. 1-4, an example color display fan deck 100 will be described in accordance with various aspects of the invention. The color display fan deck 100 includes a plurality of fan blades 105, individual ones 107, 108, and 109 of which include a planar base 115 with a top surface 120 and a bottom surface 130. In one example, the fan blades can be between about one and four inches wide and between about two and eight inches in length. The planar base 115 illustrates paint color on at least one side of the fan blade 107. The fan blade 107 further includes a planar connector 150 at an edge 152 of the at least one individual fan blade 107.

Figure 3:
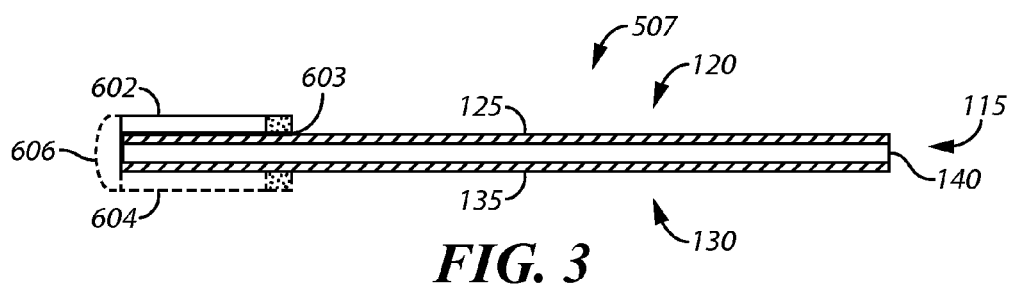
FIG. 3 is a side plan view of one example fan blade according to various embodiments of the invention.
Figure 9:
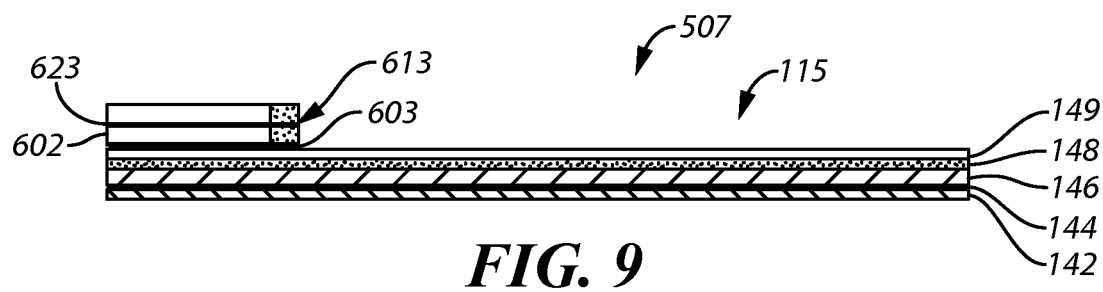
FIG. 9 is a side plan view of one example fan blade according to various embodiments of the invention.

The fan blade 107 itself can be constructed in any number of ways, including any of those known in the art. With reference to FIGS. 3 and 9, two such examples will be described. In FIG. 3, the planar base 115 of the fan blade includes a top surface 120 and a bottom surface 130. The top surface 120 includes a paint layer 125 suitable to display the paint color when the fan blade 107 is swiveled away from the other fan blades 108 and 109 of the fan deck 100. The paint layer 125 is disposed on a paper layer 140. Similarly, a separate paint layer 135 is disposed on a bottom surface 130 of the planar base 115. The second paint layer 135 may be the same color as the first paint layer 125 or a different color. United States Patent Application Publication No. 2014/0045149 describes one method of making a paint chip or fan blade according to the example of FIG. 3, which document is incorporated by reference herein. Another example fan blade is described with reference to FIG. 9. In this example, the planar base starts with a film layer 142. A layer of adhesive 144 is applied to the film layer 142 so that a paper layer 146 can be adhered to the film layer 142. The paper may be a 10 point paper sufficient to provide a stiffness to the fan blade and provide sufficient color backing so that the displayed paint color is true. Accordingly, a paint layer 148 is applied to the paper layer 146. A clear top coat 149 is applied to the paint layer 148 to help maintain the color integrity of the paint layer 148. U.S. Pat. No. 8,007,621 describes in more detail one approach to creating a fan blade such as in the example of FIG. 9, which patent is incorporated by reference herein as though fully rewritten.

Figure 4:
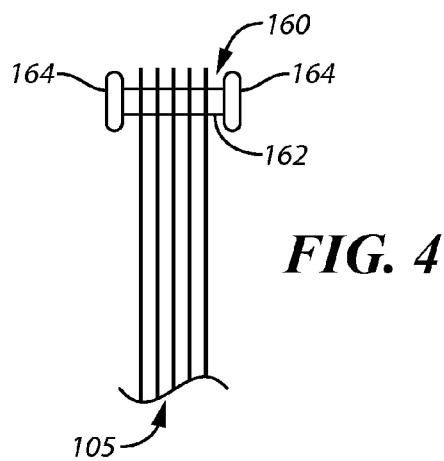
FIG. 4 is a side view of one example fan deck according to various embodiments of the invention.

A fan deck 100 includes a fastener 160, which, as illustrated in FIG. 4, includes a body 162 and ends 164. The fastener 160 ends or heads 164 are wider than the fastener body 162 to secure the fan blades 105 within the fan deck 100. In a different approach, the fastener 160 may instead be a ring similar to a key ring to secure the plurality of fan blades 105 within the fan deck 100.

Figure 5:
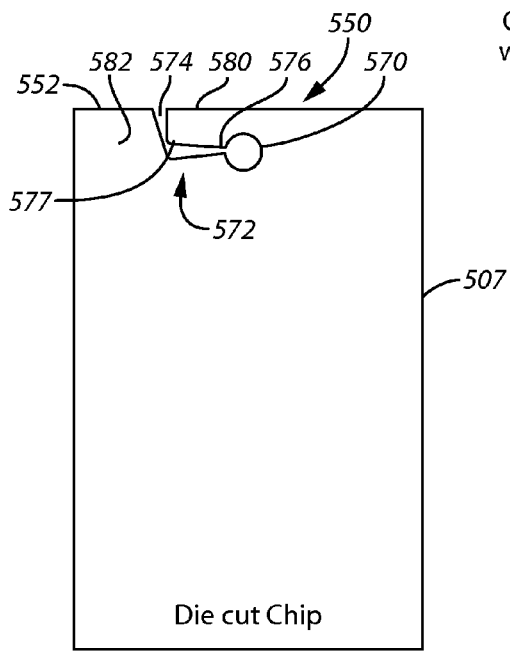
FIG. 5 is a top view of one example fan blade according to various embodiments of the invention.

Referring now to the example of FIG. 5, the planar connector 550 includes at least one opening 570. The opening 570 has an opening width that surrounds the fastener 160 at the fastener body 162 to permit the individual fan blade 507 to be swiveably held within the fan deck 100. For example, the opening 570 can be between about 0.20 inch and about 0.50 inch wide. By one approach, the planar connector 550 of the individual fan blade 507 defines a channel 572 extending from a channel end 574 to the at least one opening 570 to permit removal and/or addition of the fan blade 507 from/to the fastener 160. This channel 572 can effect a changing of the fan deck 100 without the fastener 160 being opened or removed from the fan deck 100.

At least a portion of the channel 572 has a width less than the body width of the fastener 160. In the example of FIG. 5, the channel 572 defines a shoulder 576 or narrowing next to the opening 570. The narrowing or shoulder 576 pinches around the fastener 160 so that the fan blade 507 stays secured on the fastener 160. The channel 572 may define further or other narrowings such as that at narrowing portion 577 to further secure the fan blade 507 to the fastener 160. The planar connector 550 has flexibility and resiliency to flex efficiently to permit opening the channel 572 effective to allow removal and/or addition of the fan blade 507 from/to the fastener 160 and a deformation strength sufficient to hold the fan deck 100's weight without deformation. This prevents separation of the fan deck 100 from the fastener 160 when the fan deck 100 is held by one blade 507 having the opening 570 and the channel 572.

In the example of FIG. 5, the planar connector 550 is integral with the body of the fan blade 507. In other words, the opening 570 and channel 572 are cut from the body of the fan blade 507. In this embodiment, the portion 580 of the fan blade 507 comprises a tongue that wraps around the fastener 160 and together with a further cut portion 582 of the fan blade 507 define the channel 572 through which the fastener 160 passes when adding the fan blade 507 to the fan deck 100, or removing it from the fan deck 100. In this way, the fastener 160 can pass through the edge 552 of the fan blade 507 via the channel 572 and sit within the opening 570. In various embodiments, the planar connector 550 has a thickness of from about 0.5 mils to about 100 mils (about 0.0005 inch to about 0.10 inch) wherein the thickness corresponds to the thickness of the fan blade 507. The thickness and materials of the fan blade 507 provide the deformation strength such that the planar connector 550 will hold a fan deck 100 when the fan deck 100 is held by the individual blade having the opening 570 and the channel 572. A typical fan deck 100 that will include such a fan blade has a weight from about 1.5 to about 30 ounces excluding weight of the individual blade by which the fan deck 100 is held.

Figure 6:
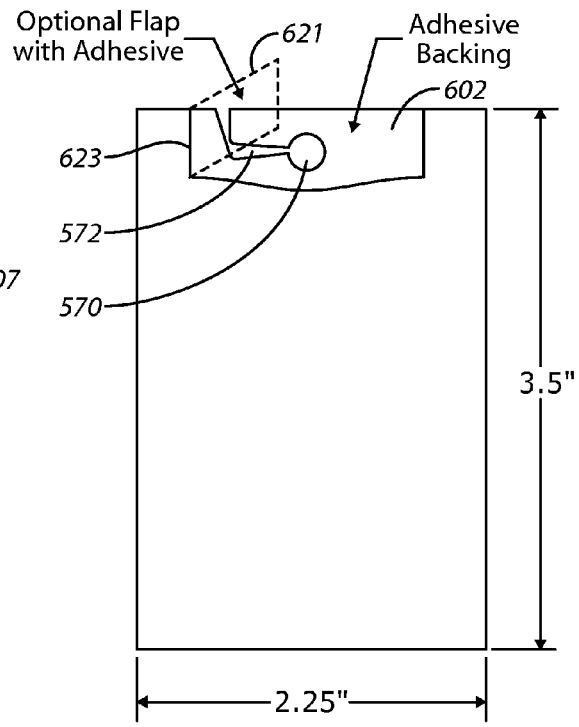
FIG. 6 is a top view of one example fan blade having a polymeric film according to various embodiments of the invention.
Figure 7:
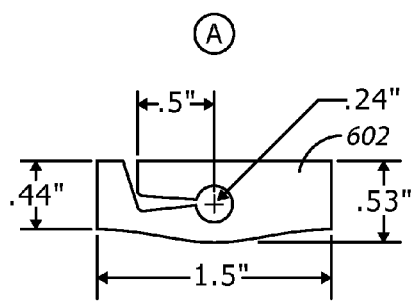
FIG. 7 is a schematic view showing dimensions of one example design for the film layer of the example fan blade of FIG. 6.

Referring to FIGS. 3, 6, and 7, in one aspect, a polymeric film 602 is disposed on one or both sides of the planar connector 550 such that the polymeric film 602 surrounds the opening 570 and the channel 572. In this example, the polymeric film 602 strengthens the planar connector 550 to provide additional strength such that the fan blade 507 is better able to support the weight of the fan deck 100 without accidently coming loose during regular use by a user. For example, the polymeric film 602 can have a thickness from about five point to about seven point depending on the fan blade 507 to which the polymeric 602 is applied. Inherently stronger fan blades 507 can use polymeric films 602 having a smaller thickness or no polymeric film at all. The polymeric film 602 in different embodiments may be selected from the group consisting of polyethylene, polypropylene, and polyethylene terephthalate.

Referring to FIG. 3, the polymeric film 602 can be disposed on merely one side of the planar base 115. The polymeric film 602 may be adhered to the planar base 115 using an adhesive 603. In other approaches, the polymeric film 602 may be laminated to the fan blade 507 to effect bonding between the polymeric film and fan blade 507, in which case a layer of one to four mil (0.001 to 0.004 inch) thick paper 603 is disposed between the film 602 and the fan blade 507 to facilitate adhesion. The thickness of the polymeric film can be between about 0.5 mils to about 100 mils (about 0.0005 inch to about 0.1 inch). By another approach, a second polymeric film 604 may be applied to the back or bottom of the fan blade 507 separately from or in addition to the polymeric film 602 applied to the top or front portion of the fan blade 507. In still a further approach, the polymeric film may be wrapped around the edge of the fan blade resulting in a portion of polymeric film 606 wrapping around the edge of the fan blade 507. The dimensions for one example polymeric film that can be applied to a fan blade are illustrated in FIG. 7. In this case, the opening and channel formed by the polymeric film 602 match that of the fan blade 507. In one approach that can simplify the manufacturing process, the polymeric film 602 without a pre-cut opening or channel can be applied to the fan blade 507, which combined polymeric film and fan blade are die-cut once at the same time to provide the opening 570 and channel 572 used for the planar connector 550. In this case, the planar connector 550 will include a portion of at least the fan blade 507 and the polymeric film 602 having therefore a combined thickness from about 1 mil to about 200 mils (about 0.001 inch to about 0.20 inch). The planar connector 550 having this combination of elements will hold the fan deck 100 when the fan deck 100 is held by the one individual blade 507 having the opening 570 and channel 572 through both the polymeric film 602 and the fan blade 507. The fan deck has a weight from about 1.5 to about 30 ounces excluding weight of the individual fan blade by which the fan deck 100 is held.

Figure 8:
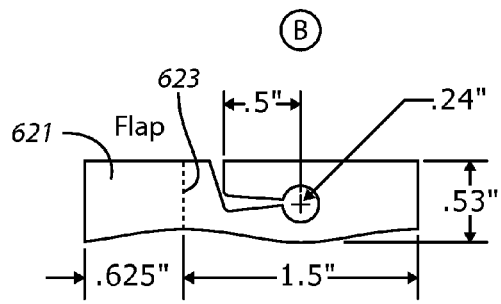
FIG. 8 is a schematic view showing dimensions of one example design for the film layer having the optional foldable flap of the example fan blade of FIG. 6.

With reference to FIGS. 6, 8, and 9, another approach includes a foldable overlay flap 621 that is configured to be folded along a fold line 623, which may be a perforated or scored portion of the film. In the illustrated example, the foldable overlay flap 621 is made of the same polymeric film 602 that is adhered to the fan blade 507. The overlay flap 621 is removably adhered to cover at least a portion of the channel 572 to block removal of the at least one individual blade 507 from the fastener 160 by blocking movement of the planar connector 550 relative to the fastener 160. In other words, by adhering the portions of the fan blade and polymeric film that define the channel 572 together, the channel 572 is unlikely to open during regular use such that the fan blade 507 inadvertently becomes removed from the fastener 160. FIG. 8 illustrates example dimensions for one such approach to having a polymeric film 602 including a foldable overlay flap 621 to secure the channel 572. FIG. 9 illustrates one such example with the overlay flap adhered to the channel 572. In this example, the polymeric film 602 is adhered to the planar base 115 using adhesive 603. The adhesive 603 is a long term and non-removable adhesive to secure the polymeric film 602 to the fan blade 507. In contrast, a removable adhesive 613 is applied to either the polymeric film surface 602 or to the inside of the overlay flap 621 such that when the overlay flap 621 is folded along a fold line 623, the removable adhesive 613 adheres the overlay flap 621 to the polymeric film 602 over at least a portion of the channel 572. In this way, the overlay flap 621 may be readily peeled off of the polymeric film 602 and the channel 572 to allow the individual blade 507 to be removed from or added to a fan deck 100.

Figure 10:
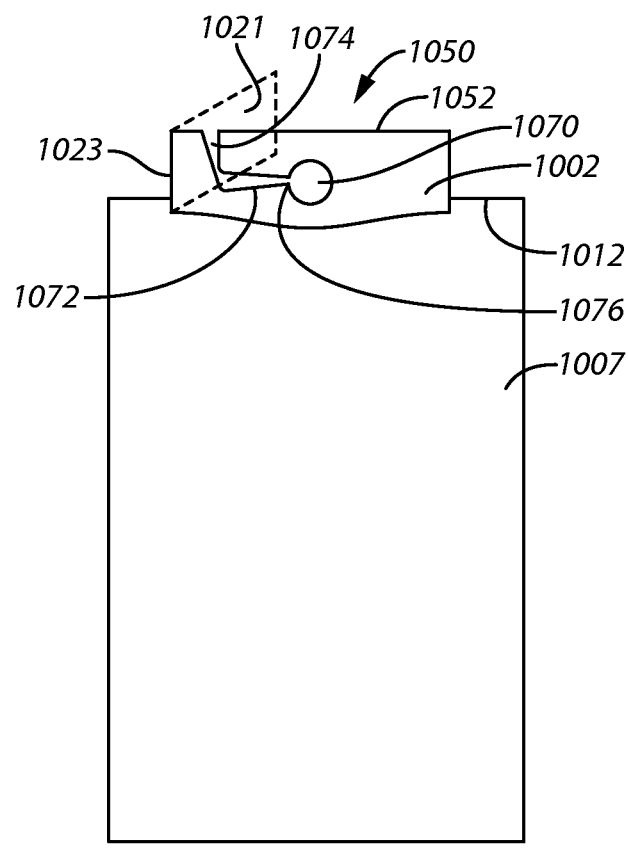
FIG. 10 is a top view of one example fan blade having a polymeric tongue extending from a fan blade according to various embodiments of the invention.
Figure 11:
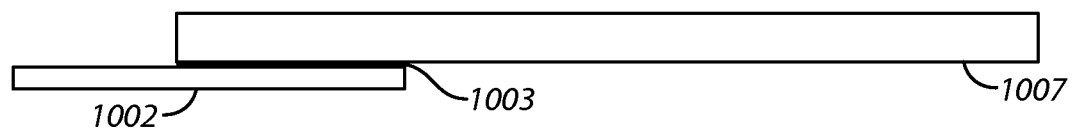
FIG. 11 is a side plan view of one example fan blade according to various embodiments of the invention.

Turning to FIGS. 10 and 11, the planar connector 1050 comprises a polymeric tongue 1002 connected to and extending from the edge 1012 of the fan blade 1007. By one approach, the polymeric tongue 1002 is comprised of the polymeric film such as that described above. In this example, the at least one opening 1070 in the fan blade 1007 is defined not by the fan blade body itself but instead by the polymeric tongue 1002 which extends from the edge 1012 of the fan blade 1007. Similarly, the channel 1072 is defined by the polymeric tongue 1002. The channel 1072 may have any of the features described above with respect to the other approaches to the channel including, for example, having a narrowing or shoulder 1076 next to the opening 1070 to help secure the fastener 160 within the opening 1070. The channel 1072 then will extend to the edge 1052 of the tongue 1002 where the fastener 160 can slide out of the channel end 1074 during removal of the fan blade 1007 from the fan deck 100.

Figure 12:
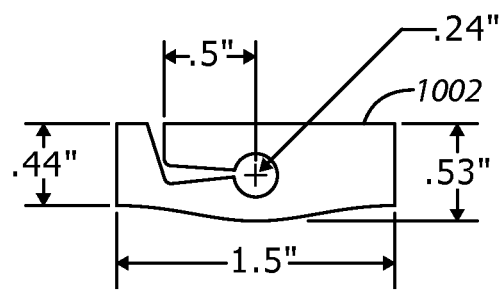
FIG. 12 is a schematic view showing dimensions of one example design for the polymeric tongue of the example fan blade of FIG. 10.
Figure 13:
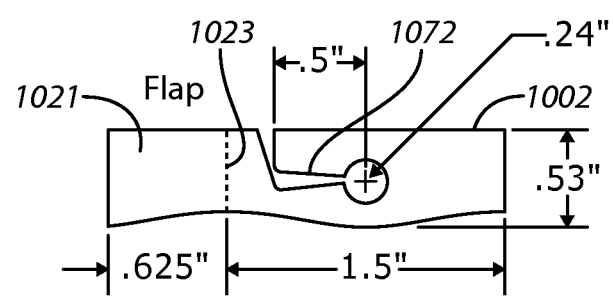
FIG. 13 is a schematic view showing dimensions of one example design for the polymeric tongue having the optional foldable flap of the example fan blade of FIG. 10.

Referring to FIG. 11, the polymeric tongue 1002 can be adhered to the fan blade 1007 using a non-removable adhesive 1003. As illustrated in FIG. 11, the polymeric tongue 1002 may be adhered to the back or bottom of the fan blade 1007, or, as illustrated in FIG. 10, the polymeric tongue 1002 may be adhered to the top or front of the fan blade 1007. By still another approach, the polymeric tongue 1002 may be laminated or adhered via legs to both or either of the top and bottom of the fan blade 1007 with the opening 1070 and channel 1072 being positioned above the edge 1012 of the fan blade 1007. In this approach, the fan blade 1007 need not be die-cut during the manufacturing process; instead the opening 1070 and channel 1072 is only die-cut into the polymeric tongue 1002 either before or after being adhered to the fan blade 1007. FIG. 12 illustrates one example set of dimensions for the polymeric tongue 1002, and other dimensions and shapes are possible for the polymeric tongue 1002. Referring to FIG. 13, the polymeric tongue 1002 may further include an optional foldable overlay flap 1021 that folds along a line 1023, which may be a perforated or scored portion of the film, to adhere to and cover at least a portion of the channel 1072. Accordingly, the flap 1021 can be adhered to the channel 1072 to further strengthen the channel and prevent flexing of the planar connector 1050 to secure the fastener within the opening 1070. As discussed above, the thickness of the polymeric tongue 1002 and the necessity of having the flap 1021 depends upon, in part, the weight of the fan deck that would be supported by the individual blade 1007 when a user holds the fan deck by the one individual blade 1007 during typical use.

So configured, an individual fan blade displaying paint on one or both sides is particularly configured to be added to and removed from a color display fan deck without having to open the fastener of the color display fan deck. The configuration or dimensions of the opening and channel of a particular version of the planar connector for the individual fan blade can be tailored to a particular application such that the planar connector 1050 will not deform and the fan blade 1007 will not accidently be removed from the fan deck during typical use. Thus, each of the options described above can be combined in different ways to achieve a satisfactory deformation strength of the planar connector 1050 to support the fan deck. In this way, a color fan deck can be modified and fan blades can be replaced or added to a given fan deck by moving the fastener for a given fan deck through the individual blade's channel so that the opening surrounds the fastener to pivotably secure the individual blade within the fan deck. The planar connector of the individual blade holds the fan deck's weight without deformation to prevent separation of the individual blade from the fastener when the fan deck is held by one individual blade.

Figure 14:
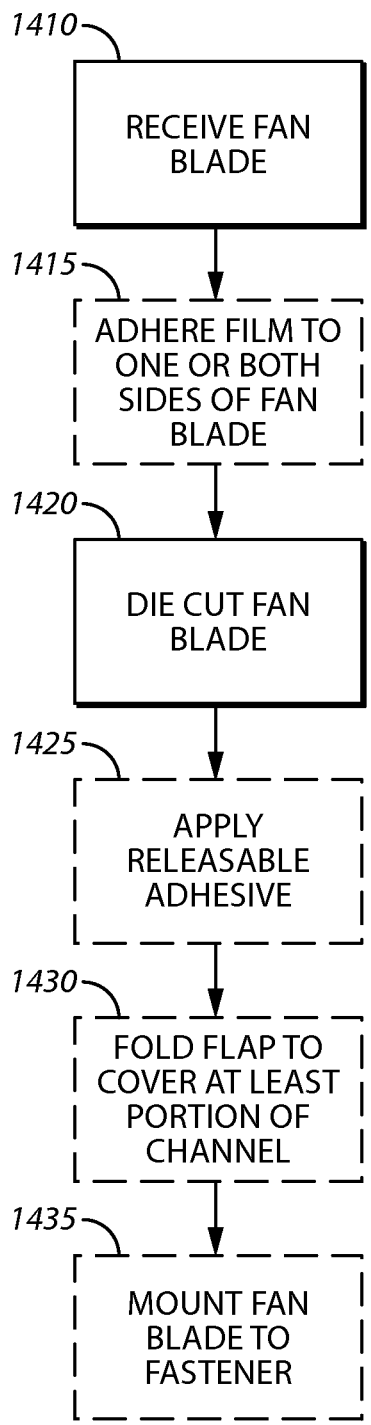
FIG. 14 is a flow diagram of example methods of making fan blades according to various embodiments of the invention.

Example methods of making a fan blade for displaying paint color that is removable from a color fan deck having a plurality of fan blades without removing the fastener that pivotably holds the fan blades together will be described with reference to FIG. 14. One method includes receiving 410 the fan blade that may be made pursuant to any applicable fan blade construction method. The fan blade is die-cut 1420 to define within the fan blade an opening having an opening width configured to surround a fastener to permit the fan blade to be pivotably held with a plurality of other fan blades within a color display fan deck. The die-cutting also defines within the fan blade a planar connector of the fan blade defining a channel that extends from a first channel end at the opening to a second channel end at or near an edge of the fan blade. The channel permits removal and/or addition of the fan blade to/from the fastener to effect a changing of the color display fan deck without the fastener being opened or removed from the color display fan deck. The die-cutting will be adapted to provide cutting the fan blade such that the planar connector having a thickness from thickness of from about 0.5 mils to about 100 mils (about 0.0005 inch to about 0.10 inch) will have a deformation strength sufficient to hold the color display fan decks weight from the fastener without deformation to prevent opening the channel to a width larger than the fasteners width. The planar connector will further have flexibility and resiliency to flex sufficiently to permit opening the channel to a width larger than the fasteners width to allow removable and/or addition of the fan blade from/to the fastener when desired.

Where a polymeric film is used, the method may include adhering 1415 the polymeric film to one or both sides of the individual blade where the polymeric film surrounds the at least one opening and the channel. The polymeric film may have a width of about five point to about seven point depending on the deformation strength sufficient to hold the fan deck in which the fan blade is contemplated to be used. As discussed above, the polymeric film to be adhered to the fan blade may be one of polyethylene, polypropylene, and polyethylene terephthalate or other suitable material. When using the polymeric film, the step of die-cutting 1420, the fan blade may further include die-cutting the fan blade together with the polymeric film after the polymeric film has been adhered 1415 to one or both sides of the fan blade. Such an approach would remove the need for precision in aligning the polymeric film having its own opening and channel with the opening and channel of the fan blade.

In the option where the polymeric film includes an overlay flap, the method may include applying releasable adhesive 1425 to releasably adhere a portion of the polymeric film over at least a portion of the channel. The flap may be folded 1430 where the flap is a portion of the polymeric film over itself to cover at least a portion of the channel. The releasable adhesive adheres the flap of the polymeric film to itself over the portion of the channel.

Whether the planar connector is made out of the fan blade itself, a combination of the fan blade and the polymeric film, or just out of the polymeric film in the form of a tongue extending from the fan blade, the fan blade is mounted 1435 to a fastener to help create a fan deck. So configured, the fan blades can be readily adapted for use in a fan deck to provide flexibility and provision of color pallets to users and customers without the difficulties in undoing a fastener or otherwise destroying a fan deck in the process of modifying the color pallet. The fan blade may be simply die-cut with a particular channel and opening sufficient to hold the weight of the fan deck, or a further in-line process may be applied to a fan blade manufacturing process to adhere or laminate a polymeric film to the fan blade to provide additional or supplemental strength for the planar connector used to connect the fan blade to the fan deck's fastener.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A color display fan deck comprising:
a plurality of fan blades, individual ones of the fan blades comprising:
a planar base with a top and bottom surface that illustrates paint color at least on one side of the fan blade, and
a planar connector at an edge of at least one individual fan blade;
a foldable, overlay flap configured to be folded; and
a fastener having a body width configured to provide pivotal rotation of the individual fan blades around the fastener;
wherein at least one planar connector includes at least one opening in the planar connector, the opening having an opening width that surrounds the fastener to permit the at least one individual fan blade to be swivelably held within the fan deck;
wherein the planar connector of the at least one individual fan blade defines a channel extending from a channel end to the at least one opening to permit removal and/or addition of the at least one individual fan blade from/to the fastener to effect a changing of the fan deck without the fastener being opened or removed from the fan deck;
wherein at least a portion of the channel has a width less than the body width of the fastener;
wherein the planar connector has flexibility and resiliency to flex sufficiently to permit opening the channel effective to allow removal and/or addition of the at least one individual fan blade from/to the fastener and a deformation strength sufficient to hold the fan deck's weight without deformation to prevent separation of the fan deck from the fastener when the fan deck is held by one blade having the opening and channel, and
wherein after folding, the foldable overlap flap is removably adhered to cover at least a portion of the channel to block removal of the at least one individual blade from the fastener by blocking movement of the planar connector relative to the fastener.

2. The color display fan deck of claim 1 wherein the planar connector has a thickness of from 0.5 mils to 100 mils (0.0005 inch to 0.10 inch) and the planar connector will hold a fan deck when the fan deck is held by the at least one individual blade having the opening and channel, the fan deck having a weight of from 1.5 to 30 ounces excluding weight of the at least one individual blade by which the fan deck is held.

3. The color display fan deck of claim 1 further comprising a polymeric film disposed on one or both sides of the at least one planar connector, the polymeric film surrounding the at least one opening and the channel.

4. The color display fan deck of claim 3 wherein the polymeric film has a thickness of from five point to seven point.

5. The color display fan deck of claim 3 wherein the polymeric film is selected from the group consisting of polyethylene, polypropylene, and polyethylene terephthalate.

6. The color display fan deck of claim 3 wherein the planar connector including a portion of the at least one individual fan blade and the polymeric film has a thickness of from 0.5 mils to 100 mils (0.0005 inch to 0.10 inch) and the planar connector will hold a fan deck when the fan deck is held by the at least one individual blade having the opening and channel, the fan deck having a weight of from 1.5 to 30 ounces excluding weight of the at least one individual fan blade by which the fan deck is held.

7. The color display fan deck of claim 3 wherein the planar connector comprises a polymeric tongue connected to and extending from the edge of the fan blade, the polymeric tongue comprising at least a portion of the polymeric film.

8. The color display fan deck of claim 7 wherein the at least one opening in the at least one individual fan blade is defined by the polymeric tongue which extends from the edge of the fan blade.

9. A color display fan deck blade that can be removed from and added to a color fan deck without unfastening a fastener having a body with a body width that holds a plurality of fan blades for rotation and display of color on one or more surfaces of the blades, the fan deck blade comprising:
a planar base with a top and bottom surface that illustrates paint color at least on one side of the fan deck blade;
a foldable, overlay flap configured to be folded; and
a planar connector at an edge of the fan deck blade,
wherein the planar connector at least in part defines at least one opening, the opening having an opening width that when the fan deck blade is in use in the color fan deck surrounds the fastener to permit the fan deck blade to be swivelably held around the body of the fastener within the color fan deck;
wherein the planar connector at least in part defines a channel extending from a first channel end to the at least one opening to permit removal and/or addition of the fan deck blade from/to the fastener to effect a changing of the color fan deck without the fastener being opened or removed from the color fan deck;
wherein at least a portion of the channel has a width less than the body width of the fastener;
wherein the planar connector has flexibility and resiliency to flex sufficiently to permit opening the channel effective to allow removal and/or addition of the fan deck blade from/to the fastener and a deformation strength sufficient to hold the color fan deck's weight without deformation to prevent separation of the fan deck blade from the fastener when the color fan deck is held by the fan deck blade; and
wherein after folding, the foldable overlap flap is removably adhered to cover at least a portion of the channel to block removal of the at least one individual blade from the fastener by blocking movement of the planar connector relative to the fastener.

10. The color display fan deck blade of claim 9 wherein the planar connector has a thickness of from 0.5 mils to 100 mils (0.0005 inch to 0.10 inch) and the planar connector will hold a fan deck when the fan deck is held by the at least one individual blade having the opening and channel, the fan deck having a weight of from 1.5 to 30 ounces excluding weight of the at least one individual blade by which the fan deck is held.

11. The color display fan deck blade of claim 9 further comprising a polymeric film disposed on one or both sides of the at least one planar connector, the polymeric film surrounding the at least one opening and the channel.

12. The color display fan deck blade of claim 11 wherein the polymeric film has a thickness of from 0.5 mils to 100 mils (0.0005 inch to 0.10 inch).

13. The color display fan deck blade of claim 11 wherein the polymeric film is selected from the group consisting of polyethylene, polypropylene and polyethylene terephthalate.

14. The color display fan deck blade of claim 11 wherein the planar connector including a portion of the fan deck blade and the polymeric film has a thickness of from 0.5 mils to 100 mils (0.0005 inch to 0.10 inch) and the planar connector will hold a fan deck when the fan deck is held by the at least one individual blade having the opening and channel, the fan deck having a weight of from 1.5 to 30 ounces excluding weight of the at least one individual blade by which the fan deck is held.

15. The color display fan deck blade of claim 11 wherein the planar connector comprises a polymeric tongue connected to and extending from the edge of the fan blade, the polymeric tongue comprising at least a portion of the polymeric film.

16. The color display fan deck blade of claim 15 wherein the at least one opening in the at least one individual fan blade is defined by the polymeric tongue which extends from the edge of the fan blade.

17. A method of making a fan blade for displaying paint color that is removable from a color fan deck having a plurality of fan blades without removing a fastener that pivotally holds the fan blades together, the method comprising:

die cutting a fan blade comprising a planar base with a top and bottom surface that illustrates paint color at least on one side of the fan blade to define within the fan blade:

an opening having an opening width configured to surround a fastener to permit the fan blade to be pivotally held with a plurality of other fan blades within a color display fan deck, and a planar connector of the fan blade defining a channel extending from a first channel end at the at least one opening to a second channel end at or near an edge of the fan blade to permit removal and/or addition of the fan blade from/to the fastener to effect a changing of the color display fan deck without the fastener being opened or removed from the color display fan deck; and wherein the planar base and the planar connector are spaced at the first channel end to a width less than the fastener's width;

wherein the planar connector has flexibility and resiliency to flex sufficiently to permit opening the channel to a width larger than the fastener's width to allow removal and/or addition of the fan blade from/to the fastener and a deformation strength sufficient to hold the color display fan deck's weight from the fastener without deformation to prevent opening the channel to a width larger than the fastener's width;

mounting the fan blade on the fastener;

adhering a polymeric film to one or both sides of the at least one individual blade, the polymeric film surrounding the at least one opening and the channel and folding a portion of the polymeric film over itself to cover at least a portion of the channel and applying releasable adhesive to releasably adhere the portion of the polymeric film over the at least a portion of the channel.

18. The method of claim 17 wherein the adhering the polymeric film comprises adhering a polymeric film having thickness of from 0.5 mils to 100 mils (0.0005 inch to 0.10 inch).

19. The method of claim 17 wherein the adhering the polymeric film comprises adhering a polymeric film selected from the group consisting of: polyethylene, polypropylene and polyethylene terephthalate.

20. The method of claim 17 wherein the die cutting comprises die cutting the fan blade together with the polymeric film.

21. The method of claim 17 wherein the die cutting comprises die cutting the fan blade such that the planar connector has a thickness of from 0.5 mils to 100 mils (0.0005 inch to 0.10 inch) and the planar connector will hold a fan deck when the fan deck is held by the at least one individual blade having the opening and channel, the fan deck having a weight of from 1.5 to 30 ounces excluding weight of the at least one individual blade by which the fan deck is held.

\* \* \* \* \*